(12) United States Patent
Hickey et al.

(10) Patent No.: US 8,053,136 B2
(45) Date of Patent: Nov. 8, 2011

(54) SORFC SYSTEM WITH NON-NOBLE METAL ELECTRODE COMPOSITIONS

(75) Inventors: Darren Hickey, Palo Alto, CA (US); Ian Russell, Sunnyvale, CA (US)

(73) Assignee: Bloom Energy Corporation, Sunnyvale, CA (US)

(*) Notice: Subject to any disclaimer, the term of this patent is extended or adjusted under 35 U.S.C. 154(b) by 0 days.

(21) Appl. No.: 12/986,291

(22) Filed: Jan. 7, 2011

(65) Prior Publication Data

US 2011/0104578 A1    May 5, 2011

Related U.S. Application Data

(60) Continuation of application No. 11/594,797, filed on Nov. 9, 2006, now Pat. No. 7,887,971, which is a division of application No. 10/658,275, filed on Sep. 10, 2003, now Pat. No. 7,150,927.

(51) Int. Cl.
    *H01M 4/92*   (2006.01)
    *H01M 8/10*   (2006.01)
    *H01M 4/90*   (2006.01)
    *H01M 8/06*   (2006.01)

(52) U.S. Cl. ......... 429/487; 429/479; 429/527; 429/413

(58) Field of Classification Search .................. 429/411
    See application file for complete search history.

(56) References Cited

U.S. PATENT DOCUMENTS

| | | | |
|---|---|---|---|
| 4,272,353 A | 6/1981 | Lawrance et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,441,821 A | 8/1995 | Merritt et al. | |
| 5,492,777 A | 2/1996 | Isenberg et al. | |
| 5,498,487 A | 3/1996 | Ruka et al. | |
| 5,527,631 A | 6/1996 | Singh et al. | |
| 5,573,867 A | 11/1996 | Zafred et al. | |
| 5,601,937 A | 2/1997 | Isenberg | |
| 5,733,675 A | 3/1998 | Dederer et al. | |

(Continued)

FOREIGN PATENT DOCUMENTS

WO    2005041329 A1    5/2005

OTHER PUBLICATIONS

L.G. Austin, "Cell & Stack Construction: Low Temperature Cells," NASA SP-120, 1967.

(Continued)

*Primary Examiner* — Karie O'Neill Apicella
(74) *Attorney, Agent, or Firm* — The Marbury Law Group PLLC

(57) ABSTRACT

A solid oxide regenerative fuel cell includes a ceramic electrolyte, a first electrode which is adapted to be positively biased when the fuel cell operates in a fuel cell mode and in an electrolysis mode, and a second electrode which is adapted to be negatively biased when the fuel cell operates in the fuel cell mode and in the electrolysis mode. The second electrode comprises less than 1 mg/cm$^2$ of noble metal.

9 Claims, 5 Drawing Sheets

U.S. PATENT DOCUMENTS

| | | | |
|---|---|---|---|
| 5,741,605 | A | 4/1998 | Gillet et al. |
| 6,013,385 | A | 1/2000 | DuBose |
| 6,051,125 | A | 4/2000 | Pham et al. |
| 6,280,865 | B1 | 8/2001 | Eisman et al. |
| 6,329,090 | B1 | 12/2001 | McElroy et al. |
| 6,403,245 | B1 | 6/2002 | Hunt |
| 6,436,562 | B1 | 8/2002 | DuBose |
| 6,558,831 | B1 | 5/2003 | Doshi et al. |
| 6,821,663 | B2 * | 11/2004 | McElroy et al. ............. 429/418 |
| 6,854,688 | B2 | 2/2005 | McElroy et al. |
| 7,150,927 | B2 | 12/2006 | Hickey et al. |
| 7,887,971 | B2 | 2/2011 | Hickey et al. |
| 2002/0058175 | A1 | 5/2002 | Ruhl |
| 2003/0205641 | A1 | 11/2003 | McElroy et al. |
| 2004/0081859 | A1 | 4/2004 | McElroy et al. |
| 2004/0191595 | A1 | 9/2004 | McElroy et al. |
| 2006/0166070 | A1 | 7/2006 | Hickey |
| 2007/0275292 | A1 | 11/2007 | Xicola et al. |

OTHER PUBLICATIONS

C.E. Milliken et al., "Low Cost, High Efficiency Reversible Fuel Cell Systems," Proceedings of the 2002 U.S. DOE Hydrogen Program Review, NREL/CP-610-32405.

R.C. Ruhl, "Low Cost Reversible Fuel Cell System," Proceedings of the 2000 U.S. DOE Hydrogen Program Review, Jun. 15, 2000, NREL/CP-570-28890.

Technology Management Inc., "Low Cost, Compact Solid Oxide Fuel Cell Generator," NASA Small Business Innovation Research Program.

"Small Ultra Efficient Fuel Cell Systems," Advanced Technology Program ATP 2001 Competition, Jun. 2002.

R.C. Ruhl, "Low Cost High Efficiency Reversible Fuel Cell & Electrolyzer Systems," Proceedings of the 2001 DOE Hydrogen Program Review, NREL/CP-570-30535.

F. Mitlitsky et al., "Regenerative Fuel Cells for High Altitude Long Endurance Solar Powered Aircraft," 28th Intersociety Energy Conversion Engineering Conference (IECEC), Jul. 28, 1993, UCRL-JC-113485.

F. Mitlitsky et al., "Unitized Regenerative Fuel Cells for Solar Rechargeable Aircraft & Zero Emission Vehicles," 1994 Fuel Cell Seminar, Sep. 6, 1994, UCRL-JC-117130.

K. Eguchi et al., "Power Generation & Steam Electrolysis Characteristics of an Electrochemical Cell with a Zirconia or Ceria-based Electrode," Solid State Ionics, 86 88 (1996).

European Search Report, EP Application 04783630, Jan. 4, 2010, 4pgs.

* cited by examiner

SORFC SYSTEM WITH NON-NOBLE METAL ELECTRODE COMPOSITIONS

This application is a continuation of U.S. application Ser. No. 11/594,797, filed on Nov. 9, 2006, which issued as U.S. Pat. No. 7,887,971, which is a divisional application of U.S. application Ser. No. 10/658,275, filed on Sep. 10, 2003, which issued as U.S. Pat. No. 7,150,927 B2.

BACKGROUND OF THE INVENTION

The present invention is generally directed to fuel cells and more specifically to reversible fuel cells and their operation.

Fuel cells are electrochemical devices which can convert energy stored in fuels to electrical energy with high efficiencies. There are classes of fuel cells that also allow reversed operation, such that oxidized fuel can be reduced back to unoxidized fuel using electrical energy as an input.

One type of reversible or regenerative fuel cell is the solid oxide regenerative fuel cell (SORFC) which generates electrical energy and reactant product from fuel and oxidizer in a fuel cell or discharge mode and which generates the fuel and oxidant from the reactant product and the electrical energy in an electrolysis or charge mode. The SORFC contains a ceramic electrolyte, a positive or oxygen electrode and a negative or fuel electrode. The electrolyte may be yttria stabilized zirconia ("YSZ") or doped ceria. The positive electrode is exposed to an oxidizer, such as air, in the fuel cell mode and to a generated oxidant, such as oxygen gas, in the electrolysis mode. The positive electrode may be made of a ceramic material, such as lanthanum strontium manganite ("LSM") having a formula $(La,Sr)MnO_3$ or lanthanum strontium cobaltite (LSCo) having a formula $(La,Sr)CoO_3$. The negative electrode is exposed to a fuel, such as hydrogen gas, in a fuel cell mode and to water vapor (i.e., reactant product) in the electrolysis mode. Since the negative electrode is exposed to water vapor, it is made entirely of a noble metal or contains a large amount of noble metal which does not oxidize when exposed to water vapor. For example, the negative electrode may be made of platinum.

However, the noble metals are expensive and increase the cost of the fuel cell. In contrast, the prior art acknowledges that the negative electrodes cannot be made from a non-noble metal in a SORFC because such electrodes are oxidized by the water vapor in the electrolysis mode. For example, an article by K. Eguchi et al. in Solid State Ionics 86-88 (1996) 1245-1249 states on page 1246 that a cell with Ni-YSZ electrodes is not suitable for a solid oxide electrolyzer cell. The article further states on page 1247 that that a high concentration of steam (i.e., water vapor) caused the deterioration of a Ni-YSZ electrode and that a noble or precious metal negative electrode is preferred.

BRIEF SUMMARY OF THE INVENTION

One preferred aspect of the present invention provides a solid oxide regenerative fuel cell, comprising a ceramic electrolyte, a first electrode which is adapted to be positively biased when the fuel cell operates in a fuel cell mode and in an electrolysis mode, and a second electrode which is adapted to be negatively biased when the fuel cell operates in the fuel cell mode and in the electrolysis mode. The second electrode comprises less than 1 $mg/cm^2$ of noble metal.

Another preferred aspect of the present invention provides a method of operating a solid oxide regenerative fuel cell, comprising operating the solid oxide regenerative fuel cell in a fuel cell mode by providing a fuel to a negative electrode and providing an oxidizer to a positive electrode to generate electricity and water vapor at the negative electrode. The method further comprises operating the solid oxide regenerative fuel cell in an electrolysis mode by providing electricity to the fuel cell and providing water vapor to the negative electrode to generate fuel at the negative electrode and oxygen at the positive electrode. The method further comprises providing a sufficient reducing atmosphere to the negative electrode when the solid oxide regenerative fuel cell operates in the electrolysis mode to prevent the negative electrode from oxidizing. The negative electrode comprises less than 1 $mg/cm^2$ of noble metal.

DETAILED DESCRIPTION OF THE PREFERRED EMBODIMENT

Figure 1:
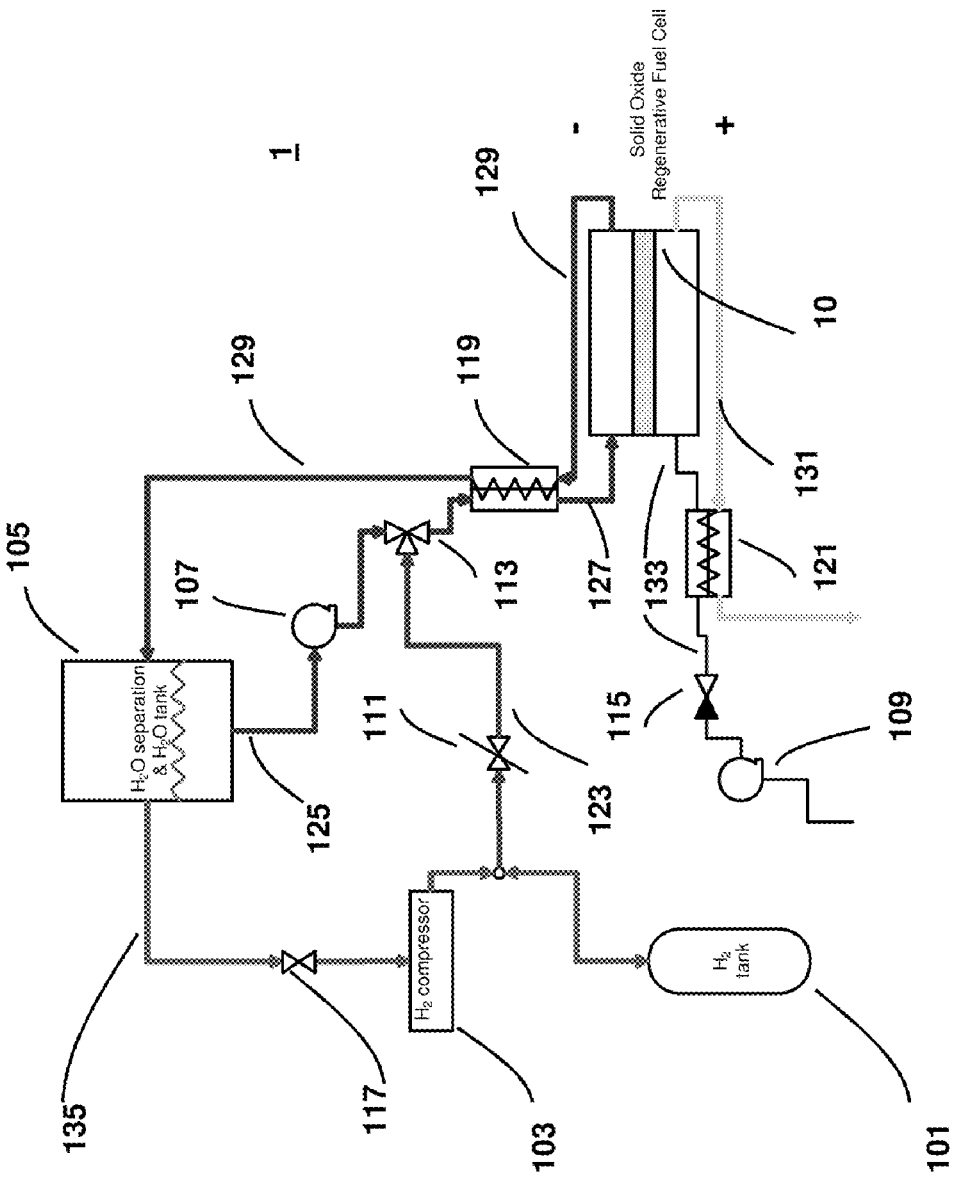
FIG. 1 is a schematic illustration of a SORFC system operating in an electrolysis mode according to a preferred embodiment of the present invention.

The present inventors have realized that SORFC negative (i.e., fuel) electrode may contain no noble metals or a small amount of noble metals, such as less than 1 $mg/cm^2$ of noble metal, if a sufficient reducing atmosphere is provided to the negative electrode when the fuel cell operates in the electrolysis mode to prevent the negative electrode from oxidizing. The use of cheaper and/or more common conductive materials in the negative electrode reduces the cost of the SORFC and improves operational performance.

As used herein, the term noble metal includes gold, iridium, palladium, platinum, rhodium, osmium and silver. These metals are also known as precious metals. Preferably, the negative electrode contains less than 20 weight percent of noble metal. More preferably, the negative electrode contains less than 0.1 $mg/cm^2$ of noble metal and less than 1 weight percent of noble metal. Most preferably, the negative electrode contains no noble metal or an unavoidable trace impurity amount of noble metal. Furthermore, it is preferred that the positive electrode also contains no noble metal or an unavoidable trace impurity amount of noble metal.

As used herein, the term SORFC (i.e., solid oxide regenerative fuel cell) includes a ceramic electrolyte, a positive or oxygen electrode which is adapted to be positively biased when the fuel cell operates in a fuel cell mode and in an electrolysis mode, and a negative or fuel electrode which is adapted to be negatively biased when the fuel cell operates in the fuel cell mode and in the electrolysis mode. Oxygen ions are conducted through the ceramic electrolyte from the positive electrode to the negative electrode when the fuel cell operates in the fuel cell mode and from the negative electrode to the positive electrode when the fuel cell operates in the electrolysis mode.

Any suitable materials may be used for the electrolyte and the electrodes. For example, the negative electrode may comprise a non-noble metal, such as at least one of Ni, Cu, Fe or a combination thereof with an ionic conducting phase (i.e., a cermet). In one preferred aspect of the invention, the negative electrode consists essentially of a Ni-YSZ cermet (i.e., a nickel-yttria stabilized zirconia cermet). Any suitable weight ratio of nickel to YSZ may be used in the electrode, such as a ratio of 30:70 to 95:5, preferably 65:35. The electrolyte may comprise any suitable ceramic, such as YSZ and/or doped ceria.

In another preferred aspect of the invention, the negative electrode consists essentially of a Ni-doped ceria cermet. Any suitable weight ratio of nickel to doped ceria may be used in the electrode, such as a ratio of 30:70 to 95:5, preferably 65:35. In this case, the electrolyte preferably comprises a doped ceria electrolyte or a combination electrolyte having a doped ceria portion or layer in contact with the negative electrode and a YSZ portion in contact with the positive electrode. The ceria may be doped with any suitable dopant, such as a Sc dopant or a rare earth dopant selected from Gd and Sm, in an amount sufficient to render the ceria to be ionically conducting.

The positive electrode may comprise any suitable material. Preferably, the positive electrode comprises a conductive perovskite ceramic material selected from LSM, LSCo, LCo, LSF, LSCoF, PSM or a combination thereof with an ionic conducting phase. Lanthanum strontium manganite ("LSM") preferably has a formula $(La_x,Sr_{1-x})MnO_3$ where x ranges from 0.6 to 0.99, preferably from 0.8 to 0.85. Lanthanum strontium cobaltite ("LSCo") preferably has a formula $(La_x,Sr_{1-x})CoO_3$ where x ranges from 0.6 to 0.99, preferably 0.8 to 0.85. If x is equal to one, then the electrode material comprises LCo. Lanthanum strontium ferrite ("LSF") preferably has a formula $(La_xSr_{1-x})FeO_3$ where x ranges from 0.4 to 0.99, preferably from 0.6 to 0.7. Lanthanum strontium cobalt ferrite ("LSCoF") preferably has a formula $(La_x,Sr_{1-x})(Fe_y,Co_{1-y})O_3$ where x ranges from 0.4 to 0.99, preferably from 0.6 to 0.7 and y ranges from 0.01 to 0.99, preferably from 0.7 to 0.8. Praseodymium Strontium Manganite ("PSM") preferably has a formula $(Pr_x,Sr_{1-x})MnO_3$ where x ranges from 0.6 to 0.99, preferably from 0.8 to 0.85. The perovskite electrode materials may optionally be admixed with the electrode ceramics, such as YSZ and doped ceria, such as GDC (gadolinium doped ceria). Other suitable pervoskite electrode materials may also be used.

As used herein, "a sufficient reducing atmosphere to prevent the negative electrode from oxidizing" comprises any suitable reducing gas which when mixed with water vapor provided to the negative electrode during electrolysis mode prevents the negative electrode from oxidizing to an extent which prevents it from operating according to its designed parameters during its expected life span, such as for at least one month, preferably at least one year, such as one to ten years, for example. Preferably, hydrogen is used as the reducing gas. However, other gases, such as forming gas (a nitrogen/hydrogen mixture) and carbon monoxide may also be used alone or in combination with hydrogen. The maximum ratio of water vapor to reducing gas provided to the negative electrode during the electrolysis mode depends on the material of the negative electrode and on the type of reducing gas used. Some negative electrode materials require more reducing gas to prevent oxidation that other negative electrode materials. For example, if a hydrogen reducing gas is used for a Ni-YSZ electrode, then the water to hydrogen ratio is preferably 8 or less, for example 0.1 to 8, such as 0.4 to 5 or 0.44 to 1. However, the water to hydrogen ratio may be different than the ratio provided above depending on various factors, such as the electrode composition, the overall gas composition provided to the negative electrode and other factors, while still preventing the negative electrode from oxidizing to an extent which prevents it from operating according to its designed parameters during its expected life span. Preferably, the reducing atmosphere (i.e., the reducing gas) does not chemically participate in the electrolysis process and is cycled through the fuel cell without being consumed.

FIG. 1 illustrates a SORFC system 1 operating in the electrolysis or charge mode. The system 1 contains a schematically illustrated SORFC 10. While only a single SORFC 10 is shown, it should be understood that the system 1 preferably contains a stack of SORFCs, containing a plurality of electrolytes, positive electrodes and negative electrodes. The system 1 also contains a fuel storage vessel 101, such as a hydrogen tank, an optional fuel compressor 103, a water-hydrogen separator/water storage device 105, a water pump 107, an oxidizer blower 109, a fuel bleed valve 111 and optional water, oxidizer and compressor valves 113, 115 and 117, respectively. The system 1 also contains heat exchangers 119 and 121 which preheat the inlet streams into the fuel cell 10 using the fuel cell exhaust streams. The system further contains fuel and oxidizer conduits, such as pipes, hoses or other suitable gas and liquid conduits, which connect the above mentioned components together.

The system contains a reducing gas conduit 123 which provides a sufficient reducing atmosphere to the negative electrode of the fuel cell 10 when the fuel cell operates in the electrolysis mode to prevent the negative electrode from oxidizing. Preferably, the reducing gas 123 conduit also comprises a fuel conduit which is used to provide fuel to the negative electrode during the fuel cell or discharge mode. Thus, the reducing gas in the electrolysis mode preferably, but not necessarily, comprises the same gas as the fuel which is used in the fuel cell mode. In the electrolysis mode, the bleed valve 111 located in the reducing gas conduit is partially opened to provide a smaller amount of fuel/reducing gas to the fuel cell than in the fuel cell mode.

Preferably, the reducing gas/fuel comprises hydrogen and the reducing gas conduit 123 comprises a hydrogen conduit operatively connected to at least one of a hydrogen compressor 103 and the hydrogen fuel storage vessel 101. The term operatively connected means that the conduit 123 may be directly or indirectly connected to the compressor 103 and/or vessel 101 to allow hydrogen to flow from the compressor 103 and/or vessel 101 through the conduit 123 into the fuel cell. The conduit 123 is operatively connected to the fuel inlet of a fuel cell 10 (i.e., to the inlet of the fuel cell stack).

The water-hydrogen separator 105 is also operatively connected to the fuel inlet of the fuel cell via the water inlet conduit 125. The separator 105 provides water to the negative electrode of the fuel cell 10 when the fuel cell 10 operates in the electrolysis mode. Preferably, the conduits 123 and 125 converge at the three way valve 113, and inlet conduit 127 provides the water and reducing gas from valve 113 to the negative electrode of the fuel cell 10.

A fuel outlet of the fuel cell 10 is operatively connected to a water-hydrogen separator 105 via a fuel exhaust conduit 129. Conduit 129 removes water from the negative electrode when the fuel cell operates in the fuel cell mode. An oxygen exhaust conduit 131 removes oxygen generated at the positive electrode when the fuel cell operates in the electrolysis mode. An oxidizer inlet conduit 133 provides an oxidizer, such as air or oxygen, to the positive electrode of the fuel cell 10 when the fuel cell operates in the fuel cell mode. In the electrolysis mode, the conduit 133 is closed by valve 115.

Figure 2:
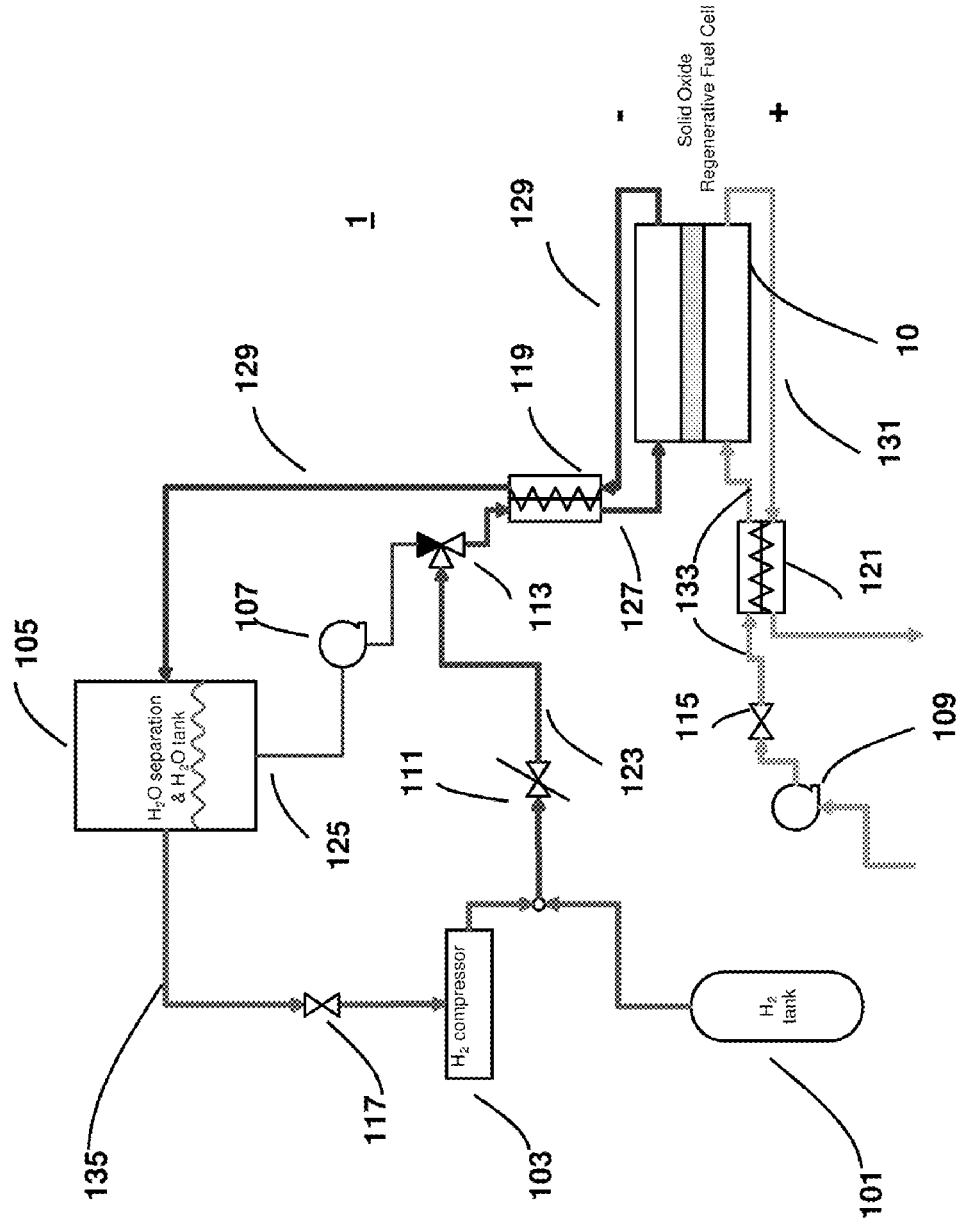
FIG. 2 is a schematic illustration of a SORFC system operating in a fuel cell mode according to a preferred embodiment of the present invention.

FIG. 2 illustrates the SORFC system 1 operating in the fuel cell or discharge mode. The system 1 is the same, except that the bleed valve 111 is opened to a greater amount than in the electrolysis mode, the oxidizer valve 115 is open instead of closed and the water valve 113 either totally or partially closes the water conduit 125.

A method of operating the solid oxide regenerative fuel cell system 1 will now be described. In the fuel cell mode shown in FIG. 2, a fuel, such as hydrogen, carbon monoxide and/or a hydrocarbon gas, such as methane, is provided to the negative electrode of the fuel cell 10 from storage vessel 101 through conduits 123 and 127. The fuel is preheated in the heat exchanger 119. If desired, some water from the separator/storage device 105 is provided via conduits 125 and 127 to the negative electrode of the fuel cell as well. Alternatively, the water may be provided from a water pipe rather than from storage.

An oxidizer, such as oxygen or air is provided to the positive electrode of the fuel cell 10 through conduit 133. This generates electricity (i.e., electrical energy) and water vapor at the negative electrode. The unused oxidizer is discharged through conduit 131. The water vapor reactant product along with unused fuel, such as hydrogen, and other gases, such as carbon monoxide, are discharged from the fuel cell through conduit 129 into the separator 105. The hydrogen is separated from water in the separator and is provided into the compressor 103 through conduit 135. The compressor 103 cycles the hydrogen back into the fuel cell 10.

In the electrolysis mode shown in FIG. 1, electricity is provided to the fuel cell. Water vapor is provided to the negative electrode of the fuel cell 10 from the separator/storage device 105 or from a water pipe through conduits 125 and 127. A sufficient reducing atmosphere, such as hydrogen gas, is also provided to the negative electrode through conduits 123 and 127. For example, at start-up of the SORFC operation, when the compressor 103 does not usually run, the hydrogen may be provided from the storage vessel 101. Subsequently, when the compressor 103 becomes operational at steady state, it provides hydrogen to the conduit 123 and to the storage vessel 101.

This generates fuel, such as hydrogen, at the negative electrode, and oxygen at the positive electrode of the fuel cell. The hydrogen, including the hydrogen generated in the electrolysis of water vapor reaction and the hydrogen provided from conduit 123 along with remaining unreacted water vapor are provided from the fuel cell 10 through conduit 129 to the separator 105. The water-hydrogen separator 105 separates the hydrogen from water, with the water being either stored or discharged. The separated hydrogen is provided to the compressor 103 through conduit 135. The compressor provides a first portion of the compressed hydrogen to the hydrogen storage vessel 101 and provides a second portion of the compressed hydrogen to the negative electrode of the fuel cell 10 through conduit 125 to maintain the sufficient reducing atmosphere at the negative electrode. The oxygen generated during the electrolysis reaction is discharged through conduit 131.

Preferably, the fuel cell 10 is cycled between the fuel cell mode and the electrolysis mode at least 30 times, such as 30 to 3,000 times. During the cycles, when the fuel cell operates in the electrolysis mode, the bleed valve 111 bleeds a first sufficient amount of hydrogen from at least one of the hydrogen compressor and the hydrogen fuel storage vessel through the hydrogen conduit 123 to the negative electrode of the fuel cell to prevent the negative electrode from oxidizing. Providing a reducing atmosphere on the negative electrode during the electrolysis mode allows the use of non-noble materials in the electrode which also maintains compatibility for the electrolysis operation.

When the fuel cell operates in the fuel cell mode, the bleed valve provides hydrogen fuel from the hydrogen storage vessel through the hydrogen conduit 123 to the negative electrode in a second amount greater than the first amount. In other words, the first amount of reducing gas should be a small amount of reducing gas, but sufficient to prevent oxidation of the negative electrode.

It should be noted that the hydrogen conduit 123 provides a sufficient amount of reducing gas to the plurality of negative electrodes of a fuel cell stack to prevent all negative electrodes of the stack from oxidizing. Therefore the negative electrodes of the SORFC stack are maintained in a reducing atmosphere, preventing oxidation of the electrode materials at elevated temperatures in the range 600-1000° C.

In alternative embodiments of the present invention, separate storage vessels are used to store fuel and the reducing gas. Preferably, this occurs when the fuel and reducing gas comprise different gases. For example, the fuel may comprise a hydrocarbon fuel rather than hydrogen, or forming gas or carbon monoxide is used as a reducing gas. In this case, a separate reducing gas storage vessel, such as a hydrogen, carbon monoxide or forming gas storage tank or pipe may be used to provide the reducing gas into the fuel cell 10 in the electrolysis mode, while the fuel storage vessel 101 is used to provide fuel into the fuel cell in the fuel cell mode.

Figure 3:
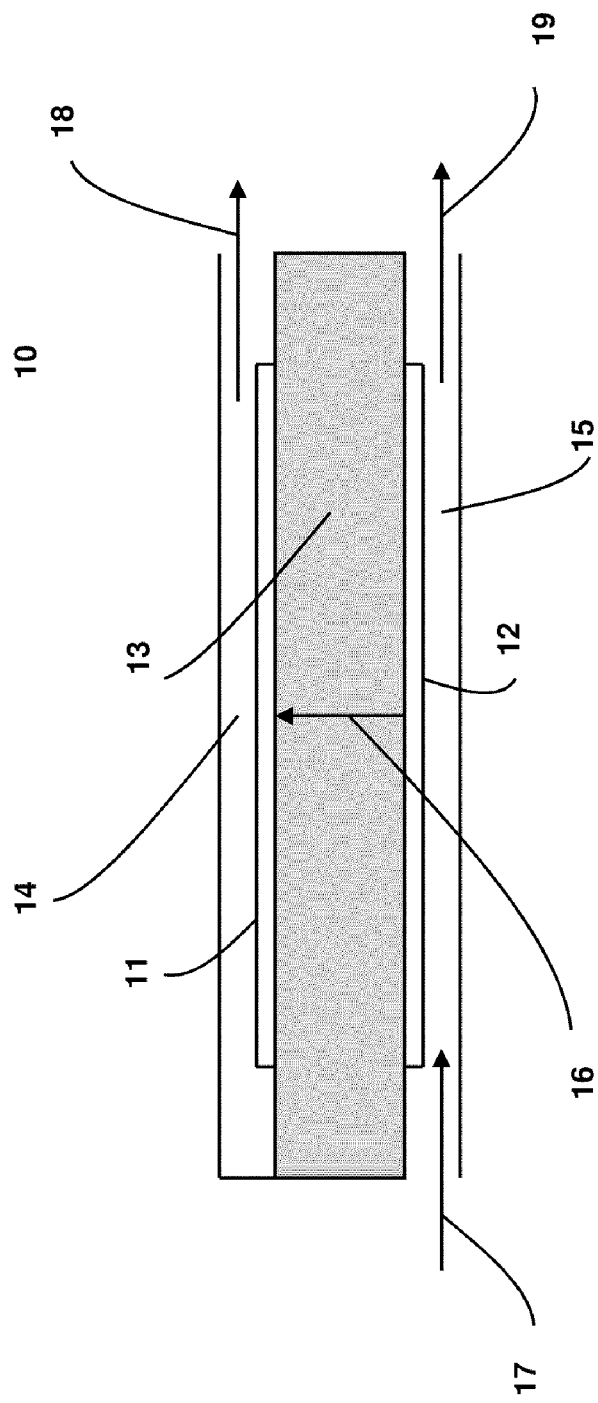
FIG. 3 is a schematic cross section of a single SORFC operating in the electrolysis mode according to a preferred embodiment of the present invention.

A single SORFC 10 operating in the electrolysis mode is shown in FIG. 3. The SORFC contains an anode (positive) electrode 11, an electrolyte 13 and a cathode (negative) electrode 12. An anode gas chamber 14 is formed between the electrolyte 13 and an anode side interconnect (not shown for simplicity). A cathode gas chamber 15 is formed between the electrolyte 13 and a cathode side interconnect (also not shown for simplicity).

A reaction product gas mixture 17 may contain primarily water with reducing gas, such as hydrogen. Alternatively, the reaction product gas mixture 17 may contain primarily water vapor and carbon dioxide if a carbon containing gas or liquid, such as methane, is used as a fuel. Hydrogen, carbon monoxide or forming gas is also added to the gas mixture as the reducing gas.

The reaction product gas mixture 17 is introduced into the cathode gas chamber 15. A direct current power source (not shown) is connected to the anode electrode 11 and the cathode electrode 12 in such a way that when electrical current is flowing, the anode electrode 11 takes on a positive voltage charge and the cathode electrode 12 takes on a negative voltage charge. When the electric current is flowing, the gas mixture 17 gives up oxygen ions 16 to form cathode discharge mixture 19 consisting primarily of hydrogen and optionally carbon monoxide if mixture 17 contained carbon dioxide. Oxygen ions 16 transport across the electrolyte 13 under the electrical current. The oxygen ions 16 are converted into the oxidant, such as oxygen gas 18 on the anode electrode 11 under the influence of the electrical current. The oxygen gas 18 is discharged from the anode chamber 14, while the electrolysis product (e.g., hydrogen and optionally carbon monoxide) is collected from the cathode chamber. If carbon monoxide is present in the product, then the product may be converted to methane fuel and water in a Sabatier reactor.

Figure 4:
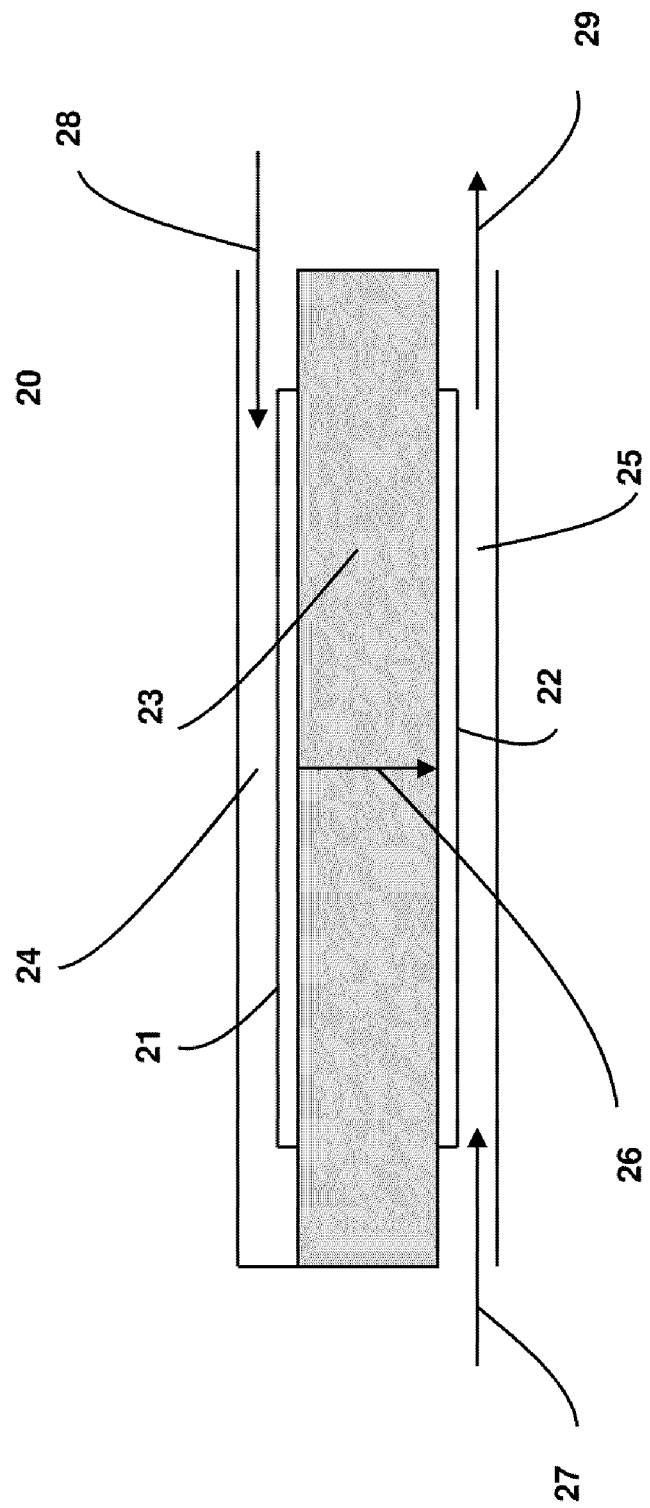
FIG. 4 is a schematic cross section of a single SORFC operating in the fuel cell mode according to a preferred embodiment of the present invention.

A single SORFC 20 operating in the fuel cell mode is shown in FIG. 4. SORFC 20 is the same as SORFC 10, except that the cathode and anode designations of its electrodes are reversed. Cathode (positive) electrode 21 is the same electrode as that identified as the anode (positive) electrode 11 in FIG. 3 when operating in the electrolysis mode. Anode (negative) electrode 22 is the same electrode as that identified as the cathode (negative) electrode 12 in FIG. 3 when operating in the electrolysis mode. Solid oxide electrolyte 23 is the same electrolyte as that identified as electrolyte 13 in FIG. 4 when operating in the electrolysis mode. Cathode gas chamber 24 is the same gas chamber as that identified as the anode gas chamber 14 in FIG. 3 when operating in the electrolysis mode. Anode gas chamber 25 is the same gas chamber as that identified as the cathode gas chamber 15 in FIG. 3 when operating in the electrolysis mode.

A fuel gas 27 is introduced into the anode gas chamber 25. An oxidizer, such as air or oxygen gas 28 is introduced into the cathode chamber 24. The fuel may comprise hydrogen, a hydrocarbon gas, such as methane, and/or carbon monoxide. Water may be added to the fuel if desired. An electrical fuel cell load (not shown) is applied to the SORFC 20 and the oxygen gas 28 forms oxygen ions 26 under the influence of the electrical load. Oxygen ions 26 transport across the electrolyte 23 under the influence of the electrical current. On the anode electrode 22, the oxygen ions 26 combine with hydrogen and optionally carbon, if present, from gas mixture 27 to form gas mixture 29 containing water vapor and optionally carbon dioxide, if a carbon containing gas is present in the fuel 27. Gas mixture 29 is discharged from the anode chamber and stored as the reaction product. In the process described above, the SORFC 20 has made electrical energy or power, which is output through its electrodes.

The SORFC systems described herein may have other embodiments and configurations, as desired. Other components, such as fuel side exhaust stream condensers, heat exchangers, heat-driven heat pumps, turbines, additional gas separation devices, hydrogen separators which separate hydrogen from the fuel exhaust and provide hydrogen for external use, fuel preprocessing subsystems, fuel reformers, water-gas shift reactors, and Sabatier reactors which form methane from hydrogen and carbon monoxide, may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety.

Figure 5:
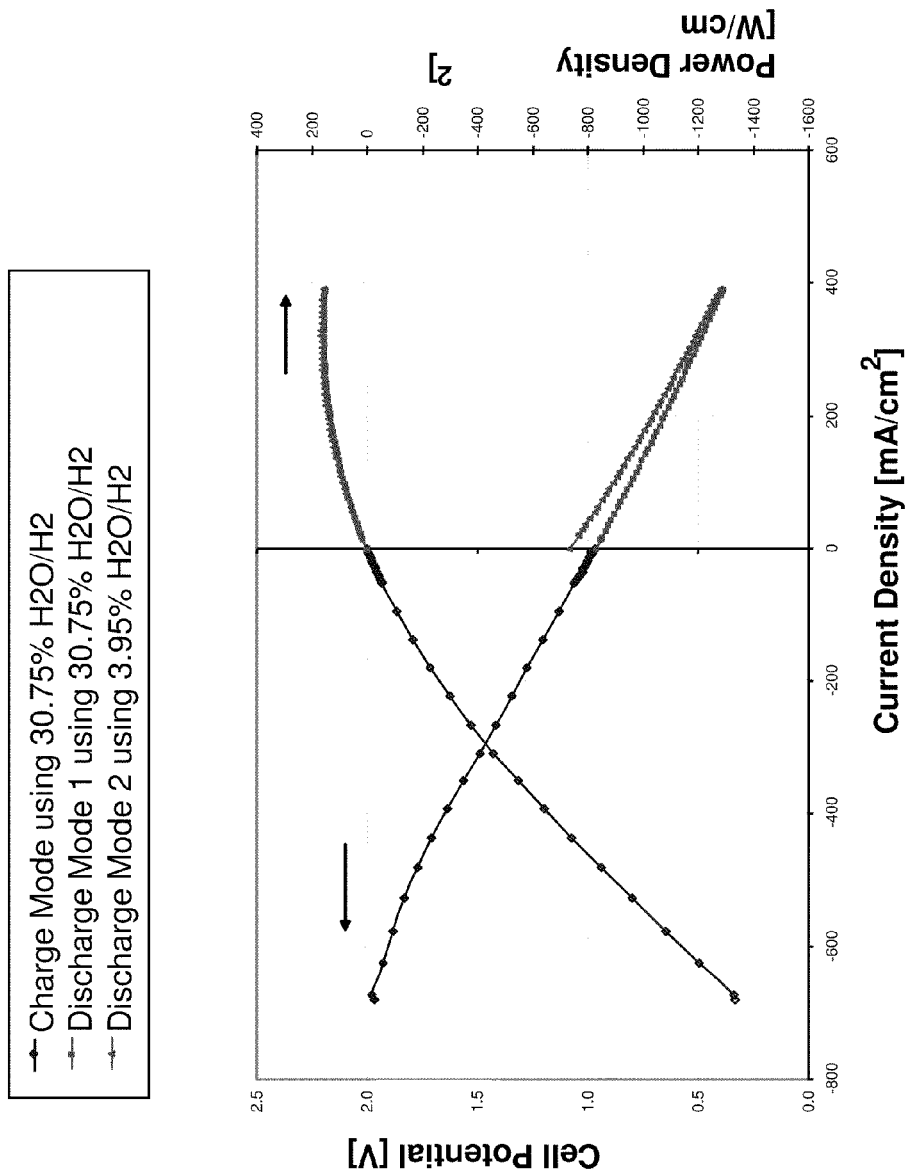
FIG. 5 is a plot of current potential and power density versus current density of a SORFC cell according to a specific example of the present invention.

The following specific example is provided for illustration only and should not be considered limiting on the scope of the present invention. FIG. 5 illustrates the plot of cell potential and power density versus current density for a single 10 cm$^2$ SORFC cell using a test bed that models the inlet gas streams as described with respect to FIGS. 1 and 2 above. The SORFC cell contains the following components. The negative or fuel electrode is a Ni-YSZ cermet electrode containing 65 weight percent Ni and 35 weight percent YSZ. This electrode is 27 microns thick and is made by screen printing on the electrolyte and being fired to 1350° C. The electrolyte is a YSZ electrolyte that is 300 microns thick. The electrolyte is tape cast and fired to 1550° C. The positive or oxygen electrode is an LSM electrode that is 39 microns thick. This electrode is made by screen printing on the electrolyte and firing to 1200° C.

The negative electrode is fed with a constant 300 sccm of $H_2$ passing through a humidifier at a set temperature. The charge (i.e., electrolysis) mode is run with the humidifier set to 70° C. or 30.75% $H_2O$. This provides an $H_2O$ to $H_2$ ratio of 0.44 to the negative electrode. One discharge (i.e., fuel cell) mode is run with the humidifier set to 70° C. or 30.75% $H_2O$, while another discharge (i.e., fuel cell) mode is run with the humidifier set to 29° C. or 3.95% $H_2O$. The $H_2O$ to $H_2$ ratio is 0.44 and 0.04, respectively, for the respective discharge mode runs. Table 1 below lists the negative electrode conditions for the various modes of operation with ambient pressure reactants.

| OPERATING MODE | $H_2$ FLOW [sccm] | HUMIDIFIER TEMP [° C.] | $H_2O$ PERCENT [%] | $H_2O/H_2$ RATIO |
|---|---|---|---|---|
| Charge Mode | 300 | 70 | 30.75 | 0.44 |
| Discharge Mode 1 ("wet hydrogen fuel") | 300 | 70 | 30.75 | 0.44 |
| Discharge Mode 2 ("dry hydrogen fuel") | 300 | 29 | 3.95 | 0.04 |

As shown in FIG. 5, this fuel cell with a negative electrode which contains no noble metal is successfully operated in both charge and discharge modes and exhibits acceptable current-voltage and current-power characteristics for reversible operation.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A solid oxide regenerative fuel cell, comprising:
   a ceramic electrolyte;
   a first electrode which is adapted to be positively biased when the fuel cell operates in a fuel cell mode and in an electrolysis mode;
   a second electrode which is adapted to be negatively biased when the fuel cell operates in the fuel cell mode and in the electrolysis mode; and
   a first device which provides a sufficient reducing atmosphere to the second electrode when the fuel cell operates in the electrolysis mode to prevent the second electrode from oxidizing;
   wherein the second electrode comprises less than 1 mg/cm$^2$ of noble metal.

2. The fuel cell of claim 1, wherein the first device comprises a hydrogen conduit operatively connected to at least one of a hydrogen compressor and a hydrogen fuel storage vessel.

3. The fuel cell of claim 2, wherein the hydrogen conduit is operatively connected to a fuel inlet of a fuel cell stack and a fuel outlet of the fuel cell stack is operatively connected to a water-hydrogen separator.

4. The fuel cell of claim 3, wherein the water-hydrogen separator is operatively connected to the fuel inlet of the fuel cell stack and is adapted to provide water to the second electrode when the fuel cell operates in the electrolysis mode.

5. The fuel cell of claim 2, further comprising a valve which is adapted to bleed a first sufficient amount of hydrogen from at least one of the hydrogen compressor and the hydrogen fuel storage vessel through the hydrogen conduit to the second electrode to prevent the second electrode from oxidizing when the fuel cell operates in the electrolysis mode and which is adapted to provide hydrogen fuel from the hydrogen storage vessel through the hydrogen conduit to the second electrode in a second amount greater than the first amount when the fuel cell operates in the fuel cell mode.

6. The fuel cell of claim 1, wherein the first device comprises a forming gas conduit operatively connected to a forming gas storage vessel.

7. The fuel cell of claim 1, wherein the first device comprises a carbon monoxide conduit operatively connected to a carbon monoxide storage vessel.

8. The fuel cell of claim 3, further comprising a water pump located between the water-hydrogen separator and the hydrogen conduit, the water pump configured to pump water from the water-hydrogen separator to the hydrogen conduit.

9. The fuel cell of claim 3, further comprising a heat exchanger configured to preheat hydrogen from the hydrogen conduit prior to delivering the hydrogen to the second electrode.

* * * * *